Oct. 23, 1951 — W. L. KEILWITZ — 2,572,491
FIREPLACE DAMPER
Filed March 17, 1947

INVENTOR.
WILLIAM L. KEILWITZ
BY
ATTORNEY

Patented Oct. 23, 1951

2,572,491

UNITED STATES PATENT OFFICE 2,572,491

FIREPLACE DAMPER

William L. Keilwitz, Idaho Springs, Colo.

Application March 17, 1947, Serial No. 735,201

1 Claim. (Cl. 126—288)

This invention relates to dampers for permanent, operatively-adjustable installation in draft-regulating association with conventional fireplaces and analogous structures, and has as an object to provide an improved construction and unitary interrelation of elements constituting such a damper.

A further object of the invention is to provide an improved damper unit adapted for simple, convenient fabrication from conventionally-available materials to meet size, proportion, and strength requirements of varying specific installations.

A further object of the invention is to provide an improved damper unit susceptible of operative manipulation through any selected one of several alternative controls whereto the unit may be adapted to respond.

A further object of the invention is to provide an improved damper unit reactive to high temperatures and rapid temperature variations with a minimum of distortion and consequent operative impairment.

A further object of the invention is to provide an improved damper unit of relatively light weight in proportion to its operatively-effective area.

A further object of the invention is to provide an improved damper unit having an adjustable characteristic requiring very little structural clearance.

A further object of the invention is to provide an improved damper unit selectively adjustable between fully open and fully closed relation with a draft passage traversed thereby.

A further object of the invention is to provide an improved damper unit susceptible of installation in draft-controlling relation with a vent passage with but little fixed restriction of the passage area.

A further object of the invention is to provide an improved damper unit that is inexpensive of manufacture, easy to install, simple to operate, positive and efficient to attainment of the ends for which designed, and which is operatively durable throughout a long life of practical use.

With the foregoing and other objects in view, my invention consists in the construction, arrangement, and combination of elements hereinafter set forth, pointed out in my claim, and illustrated by the accompanying drawing, in which—

Figure 1:
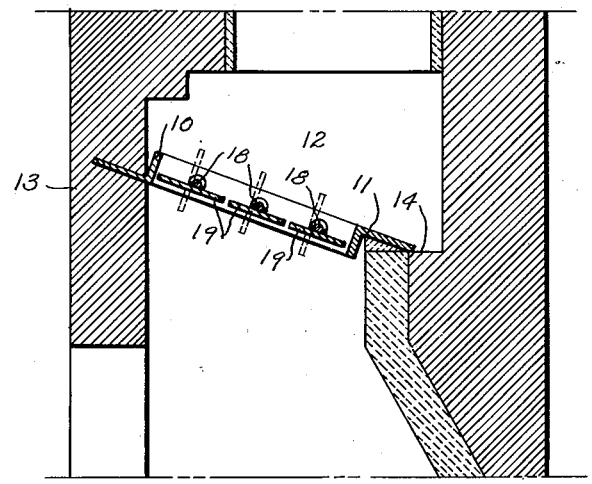
Figure 2:
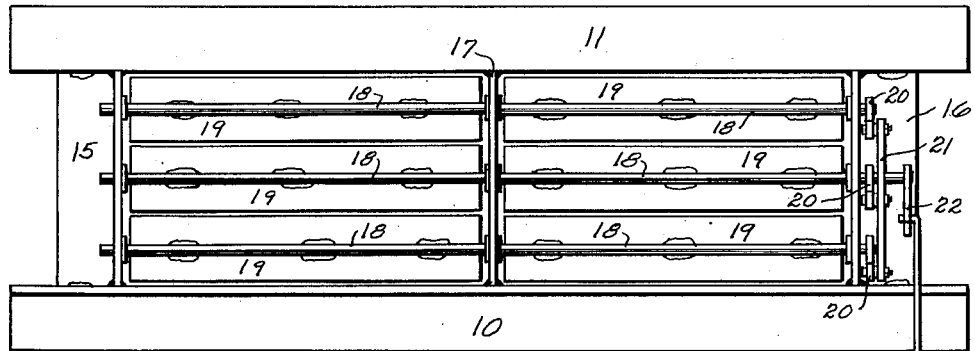
Figure 3:
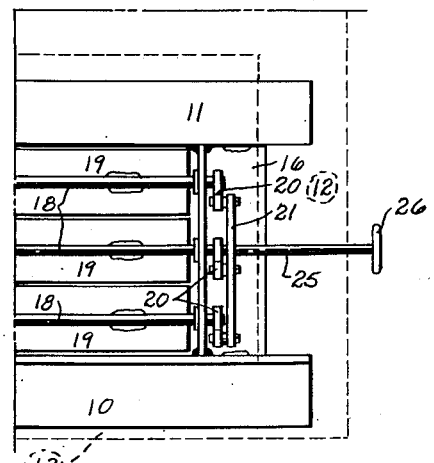
Figure 4:
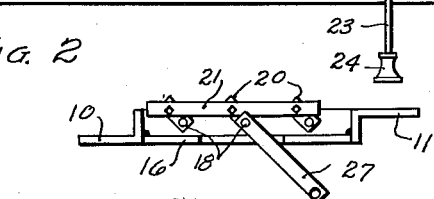
Figure 5:
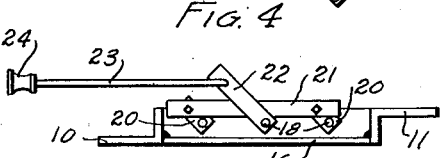

Figure 1 is a section vertically through a typical embodiment of the invention as operatively installed in the throat of a conventional fireplace, broken lines indicating an extreme alternative position attainable by movable elements of the assembly. Figure 2 is a plan view, on an enlarged scale, of the damper unit shown in Figure 1 as arranged for one type of manual control. Figure 3 is a fragmentary, detail plan of one end of the damper shown in Figure 2 as arranged for an alternative type of manual control. Figure 4 is an end view of the damper according to Figure 2 as arranged for adjustable reaction to yet a third type of manual control. Figure 5 is an end view of the showing of Figure 2.

In the construction of the improved damper as shown, a rigid, rectangular frame surrounding and defining a rectangular opening approximating the size and shape of the transverse throat area in the fireplace wherewith the unit is to be associated is fabricated from structural steel shapes, such as angle bars, in a manner to facilitate incorporation thereof in operative relation with the usual masonry fireplace during erection of the latter. The damper frame conveniently and preferably is comprised from four lengths of cross-sectionally identical angle bars so cut as to provide a relatively longer pair of identical members and a relatively shorter pair of identical members. The longer frame members 10 and 11 exceed in length the spacing between opposed inner faces of the fireplace throat side walls 12 to bridge entirely across said throat with their ends embedded in and supported by the masonry of said side walls, and are arranged in spaced parallelism and in opposed adjacency of their corresponding flanges to outwardly and oppositely opening disposition of their angles, it being structurally expedient, though not operatively significant, that the upwardly and outwardly opening angle bar 10 constitute the forward side of the frame for embedded reception of its outward flange within the masonry of the fireplace throat forward wall 13 and that the outwardly and downwardly opening angle bar 11 constitute the rearward side of the frame for engagement of its outward flange over the forward margin of and against the usual smoke shelf 14 upwardly terminating the fireplace throat. The shorter frame members 15 and 16 have corresponding lengths slightly less than the throat clear spacing between the smoke shelf 14 forward margin and the rear face of the forward wall 13 and are arranged in spaced, parallel opposition between, perpendicular to, and inwardly from the ends of the members 10 and 11 so as to end-abut against the opposed parallel flanges of the latter, in which position and interrelation the member 15 and 16 ends are securely and permanently welded to the member 10 and 11 portions thereby engaged; the outward flanges of the members 15 and 16 preferably being coplanar with the outward flange of the member 10. Intermediate and parallel with the members 15 and 16, a flat, rigid strut 17 is end-welded to and fixedly bridges perpendicularly between the opposed parallel flanges of the members 10 and 11 to stiffen and brace the damper frame and to transversely bisect the frame opening for purposes hereinafter set forth.

The damper frame constructed and arranged as shown and described is a rigid unit, light in weight in proportion to its rigidity and strength, highly resistant to heat-induced failures and distortions by virtue of the typical rolled character of the angle bar stock as distinguished from cast or moulded metal, and adapted for convenient incorporation in and in laterally-traversing relation with a fireplace throat in such elevation of its forward margin above the smoke shelf 14, and consequent inclination of the frame relative to the horizontal, as may be desired or indicated by the proportions, dimensions, and clearances of the throat and related structures, the outwardly-extending, coplanar flanges of the members 10, 15 and 16 sealing into their respective masonry walls to accommodate a wide range of frame inclinations and a considerable variation in throat dimensions while effectively closing all passage through said throat exteriorly of and about said frame.

Completing the throat-mounted frame for selective regulation of air and gas flow through the frame openings constituting the effective fireplace throat, a plurality of identical rods 18, illustrated as three in number, is disposed to rotatable engage through aligned holes intersecting the strut 17 and vertical flanges of the members 15 and 16 in spaced, parallel relation with and between the members 10 and 11 and in longitudinally traversing relation across the frame openings, each of the said rods 18 extending from one and to the other of the frame ends and projecting at each of its ends outwardly beyond the corresponding frame member flange thereby intersected. The section of each rod 18 traversing a frame opening is fixed to and rigidly supports a vane or panel 19, preferably of rolled or forged metal stock, of rectangular shape and of a size to substantially close at its ends against the strut 17 and proximate frame end member and at its sides against adjacent panel 19 side margins, or an adjacent panel side margin and one of the frame member 10 or 11 inner flange faces, to approximately fill and effectively obstruct the frame opening wherein they are mounted when their rods 18 are rotated to bring the said panels into a common plane. As is readily apparent, the panels 19 may be all of uniform size and the spacing and disposition of the rods 18 such as to mount said panels to fill the frame openings with each rod section longitudinally traversing and bisecting one face of its associated panel, and the widths of the panels in a given assembly may be determined to slightly space apart their adjacent long margins, as shown, or to cause said adjacent long margins to interengage in slightly overlapped relation, as is customary practice in analogous devices. The panels 19 are welded or otherwise permanently fixed to their respective rod 18 sections and thereby serve to position said rods against displacement longitudinally of their journal mountings in the frame and the two panels carried by each rod 18 are coplanar in end-spaced alignment thereon.

The panel-equipped rods 18 are linked together for simultaneous rotational actuation with their panels in maintained parallelism, for which purpose like radial arms 20 are individually fixed to corresponding ends of the said rods closely and exteriorly adjacent the vertical web of one of the end members 15 or 16 to project in spaced parallelism perpendicularly from said rods and at an upward and forward inclination of some forty-five degrees relative to the plane of the panels 19 when the latter are in closing relation with the frame openings, and a straight rigid bar 21 bridges across and hingedly connects with corresponding outer points of the arms 20 to operatively link the latter in maintained parallelism. With the rods 18 link-connected as shown and described, forces applied to effect rotation of any one of said rods are transmitted to accomplish corresponding rotation of the other rods 18 of the assembly with consequent synchronous and corresponding adjustment of the panels 19 in maintained parallelism, the balanced relation of the panels on their rods 18 functioning to obviate any self-closing or self-opening tendency of the adjustable elements and permitting the frictions inherent in the assembly to hold the movable elements in any position to which they have been adjusted. Selectively-actuatable means convenient for manual control are provided to facilitate adjustment of the damper panels in any installed disposition of the unit, said means being somewhat alternative in specific structure for actuation from the front, side, or firebox interior of the fireplace and adaptable to operative relation with any one of the rods 18 at either end of the unit. As shown in Figures 2 and 5, an arm 22 is fixed to an outwardly-extending end of one, in this instance the center, of the rods 18 in spaced, parallel relation with and adjacent the arm 20 associated with said rod, and a hole or slot in the outer end of said arm 22 engages with one end of a pull-rod 23 adapted for horizontal, reciprocable disposition through the forward wall 13 of the fireplace structure at one side of and above the firebox thereof. The pull-rod 23 has a length such as will project exteriorly of the wall 13 front face when the arm 22 is at the limit of its range of oscillation away from said wall and is equipped with a knob 24, or analogous device, on its outer or free end to facilitate manipulation of said rod for regulation of the opening or draft areas controlled by the panels 19. In the modification according to Figure 3, adapted for sidewall disposition of the control, no control arm is employed and in place thereof a longitudinal extension 25 is formed on or secured in axial alignment to one of the rods 18 for rotatable accommodation in and projection outwardly through one of the fireplace side walls, a manipulating knob, wheel, or lever 26 terminating the extension 25 exteriorly of the fireplace for operative facility and pleasing effect. When it is undesirable or inexpedient to have the control means traverse walls of the masonry fireplace structure, an arm 27 similar to and somewhat longer than the arm 22 may be fixed to an outer end of one of the rods 18 to depend in parallel with the associated arm 20 through a slot or notch in the outwardly-directed lower flange of the corresponding end member 15 or 16 and hence into an upper end corner of the fire-box, an aperture or eye in the free lower end of said arm 27 being convenient of engagement by the hooked end of a tool, such as a poker, whereby oscillation of said arm and consequent adjustment of the damper panels may be had, such an arrangement of elements being exemplified by Figure 4.

Since many changes, modifications, and variations in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention:

A damper unit for fireplace installation comprising a pair of relatively long, identical angle bars in spaced parallelism with their corresponding vertical legs paralleled in spaced opposition and their horizontal legs oppositely outstanding as mounting flanges in spaced parallelism outwardly from an upper margin of one and a lower margin of the other of said vertical legs, a pair of relatively shorter, identical angle bars spacedly paralleled and perpendicularly connecting rigidly between the opposed vertical legs of said relatively long bars, each of said shorter bars being disposed inwardly from the adjacent ends of the longer bars thereby interconnected with its vertical leg opposed to the corresponding leg of the spacedly-related like bar and its horizontal leg projected outwardly from said vertical leg lower margin in coplanar relation with the lower horizontal mounting flange leg of the associated longer bars, whereby to define a rectangular draft opening bounded by the flat, opposed, vertical legs of said bars and surrounded by mounting flange outward projection of the angle bar horizontal legs and end-closed, upwardly and outwardly opening compartments exteriorly adjacent the draft opening ends determined by the shorter angle bar legs and the longer bar vertical legs thereby engaged, a strut rigidly engaging between said relatively longer bar vertical legs in parallel with said relatively shorter bars to bisect said draft opening, straight, cylindrical rods journaled in spaced, parallel relation for rotation about their respective axes in and through said strut and relatively shorter bar vertical legs in longitudinally traversing relation across said draft opening to similarly project at their ends beyond said shorter bar legs and into the compartments thereby determined, complementary panels fixed in balanced relation to and for rotation with said rods in obstructing relation within both sections of the draft opening, and connections housed within one of the compartments adjacent the draft opening ends colinking the corresponding rod ends therein for selective, simultaneous rotation in maintained parallelism of their associated panels.

WILLIAM L. KEILWITZ.

REFERENCES CITED

The following references are of record in the file of this patent:

UNITED STATES PATENTS

| Number | Name | Date |
|---|---|---|
| 1,163,929 | Jensen | Dec. 14, 1915 |
| 1,403,054 | Nabers | Jan. 10, 1922 |
| 1,408,204 | Jensen | Feb. 28, 1922 |
| 1,413,469 | Gentrup | Apr. 18, 1922 |
| 1,871,161 | Dickson | Aug. 9, 1932 |
| 2,152,447 | Wheeler | Mar. 28, 1939 |
| 2,185,712 | Rowley | Jan. 2, 1940 |
| 2,293,065 | Kiczales | Aug. 18, 1942 |